MAGNETIC WIRE RECORDING

Filed Feb. 26, 1959 4 Sheets-Sheet 1

INVENTOR.
James R. Bailey
By Lindberg & Bradway
attorneys

May 2, 1961 J. R. BAILEY 2,982,488

MAGNETIC WIRE RECORDING

Filed Feb. 26, 1959 4 Sheets-Sheet 2

INVENTOR.
James R. Bailey
BY
Lindberg & Bradway
Attorneys

May 2, 1961

J. R. BAILEY 2,982,488

MAGNETIC WIRE RECORDING

Filed Feb. 26, 1959

4 Sheets-Sheet 3

INVENTOR.

James R. Bailey

BY

Lindberg & Bradway

Attorneys

May 2, 1961 J. R. BAILEY 2,982,488

MAGNETIC WIRE RECORDING

Filed Feb. 26, 1959 4 Sheets-Sheet 4

INVENTOR.

James R. Bailey

BY

Lindberg & Bradway attorney

1

2,982,488

MAGNETIC WIRE RECORDING

James R. Bailey, 4020 N. Pioneer Ave., Chicago, Ill.

Filed Feb. 26, 1959, Ser. No. 795,661

7 Claims. (Cl. 242—54.1)

This invention relates to improvements in magnetic wire recording devices, and more particularly to mechanism for moving the wire recording medium past the recording and reproducing head, and for storing the record medium.

Heretofore, commonly employed apparatus for handling the wire in such machines consisted of a pair of rotating reels which alternated as storage and pay off reels. Proper coordination of the two reels required, among other precautions, some provision for maintaining adequate but not excessive tension on the wire passing between the two reels. Yet experience had shown that breakage of the wire often occurred, resulting in hopelessly tangled and twisted recording wire. Furthermore, for normal recording purposes, rapid stopping and starting of such reels involved the need for rapid acceleration and deceleration of rather heavy moving parts.

The present invention provides a wire transfer mechanism in which there does not exist the problem of overcoming the momentum or inertia of heavy masses.

A particular object of the invention is to provide a storage and feeding mechanism for a recording wire which includes stationary drums or reels on which the wire is wound or unwound.

Another object of the invention is to provide a wire storage mechanism in which stationary drums are used and in which there is a further provision for layer winding of the wire.

Other objects and advantages of the invention will become apparent from a perusal of this specification and will be specifically alluded to therein.

Figure 2:
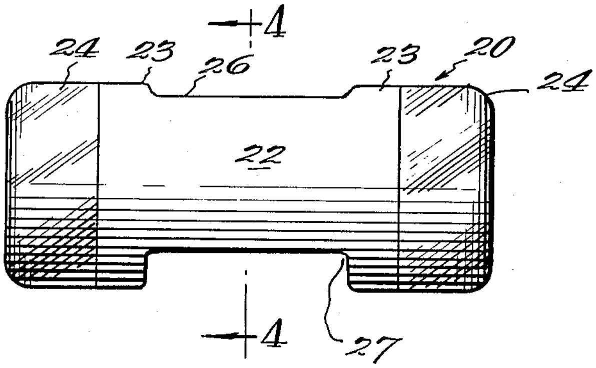
Fig. 2 is a plan view thereof.
Figure 1:
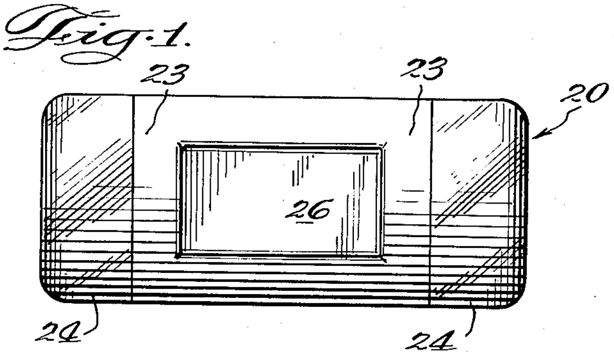
Fig. 1 is a front elevational view of a magazine for storing a wire recording medium, said magazine being adapted for use in a device embodying the improvements according to the present invention.
Figure 3:
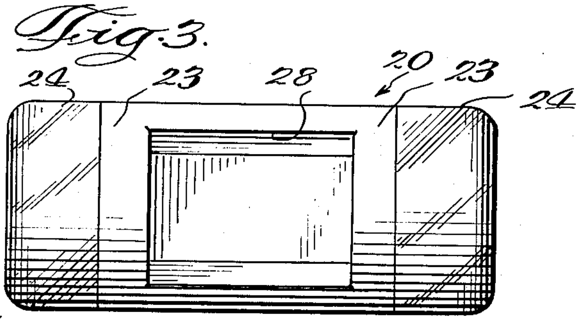
Fig. 3 is a rear elevation view thereof.
Figure 4:
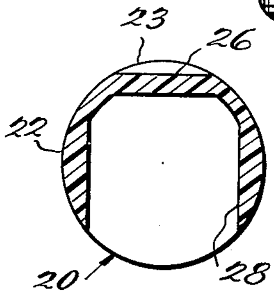
Fig. 4 is a section taken along the line 4—4 of Fig. 2 looking in the direction of the arrows.

2 and an alternate form of wire-guiding means employed therewith.

Referring now to the drawings, particularly Figs. 1 to 5, there is shown a magazine or cartridge 20 adapted to store a wire recording medium. Such a recording medium is shown at 21 in Figs. 6 and 7. As seen in Figs. 1 to 5, the magazine 20 is generally cylindrical in form and includes a center portion 22 molded integrally with flanges 23. A pair of opposed end closures 24 are held to the end flanges 23, see also Figs. 6 and 7. As seen more clearly in Fig. 2 the magazine 20 has a front wall 26 extending between the flanges 23, 23. The generally cylindrical form of the center portion 22 has a generally rectangular opening 28 therein on the side opposite from the front wall 26. The opening 28 enables the cartridge 20 to be placed upon a pair of spaced flanges 29 and 31, see particularly Fig. 10, which extend into cartridge 20.

Within each of the end closures 24 and molded integrally with the flanges 23 is a reel 32 adapted to store the recording medium 21 preferably by layer winding thereon. It should be noted at this point that the storage reels 32, 32 are stationary and that the recording medium 21 is wound or stored thereon by mechanism traveling orbitally of the fixed reel, and requiring but little mass for the placement of the recording medium 21 on the storage reels 32.

The magazine thus far described is adapted to be placed upon the spaced flanges 29 and 31, said flanges extending from a housing 33 of a recording device, which housing encloses means for driving the record medium 21 and for causing the record medium to be payed off from one of the reels 32 and to be stored on the other reel. The housing 33 encloses a recording head referred to generally by the reference numeral 34. The precise form of such head forms no part of the present invention and is well known in the art.

The housing 33 encloses a drive motor 35 having a drive shaft 36. The drive shaft 36 terminates in a conical tip 37 which extends between and cooperates with beveled driving discs 38 and 40.

The beveled driving disc 38 is arranged to move the recording medium 21 from the right hand reel 32 past the recording head 34 where it is stored upon the left hand storage reel 32. The driving disc 38 is fast upon a shaft 39 turning in a bushing 41 supported in a frame member 42 of the housing 33. The shaft 39 drives a puck 43 having a rubber rim 44. The puck 43 is fast upon a stub shaft 46 supported in spaced arms 48 of a shifter yoke 49. Each of the arms 48 is supported on the bushing 41 and together with the yoke 49 rock as a unit about the shaft 39 as a center.

The stub shaft 46 is adapted to cooperate with a driven puck 51 having a rim 52 made of rubber or similar friction material. The puck 51 is fast upon a shaft 53 turning within a bushing 54 supported by the left hand reel 32 and the shaft 53 is concentric with the fixed reel 32.

The shaft 53 is concentric with a wire guide sleeve 55, said sleeve also being fast with the shaft 53. The wire guide sleeve is formed integrally with a winding arm 56 which is bent as shown at 57 around the periphery of the left hand reel 32.

The other driving disc 40 is similarly fast upon a shaft 58 turning in a bushing 59 held in the support 42. Shaft 58 is in driving engagement with a puck 61 having a rubber rim 62 thereon contacting the shaft 58. The puck 61 is fast on a stub shaft 63 having an enlarged portion 64 at times in engagement with a beveled driven roller 66.

The shaft 63 turns in bushings 67 in turn supported in spaced arms 68 of a shifter yoke 69. The shifter yoke 69 rocks on the bushing 59 with the shaft 58 as a center.

Figure 6:
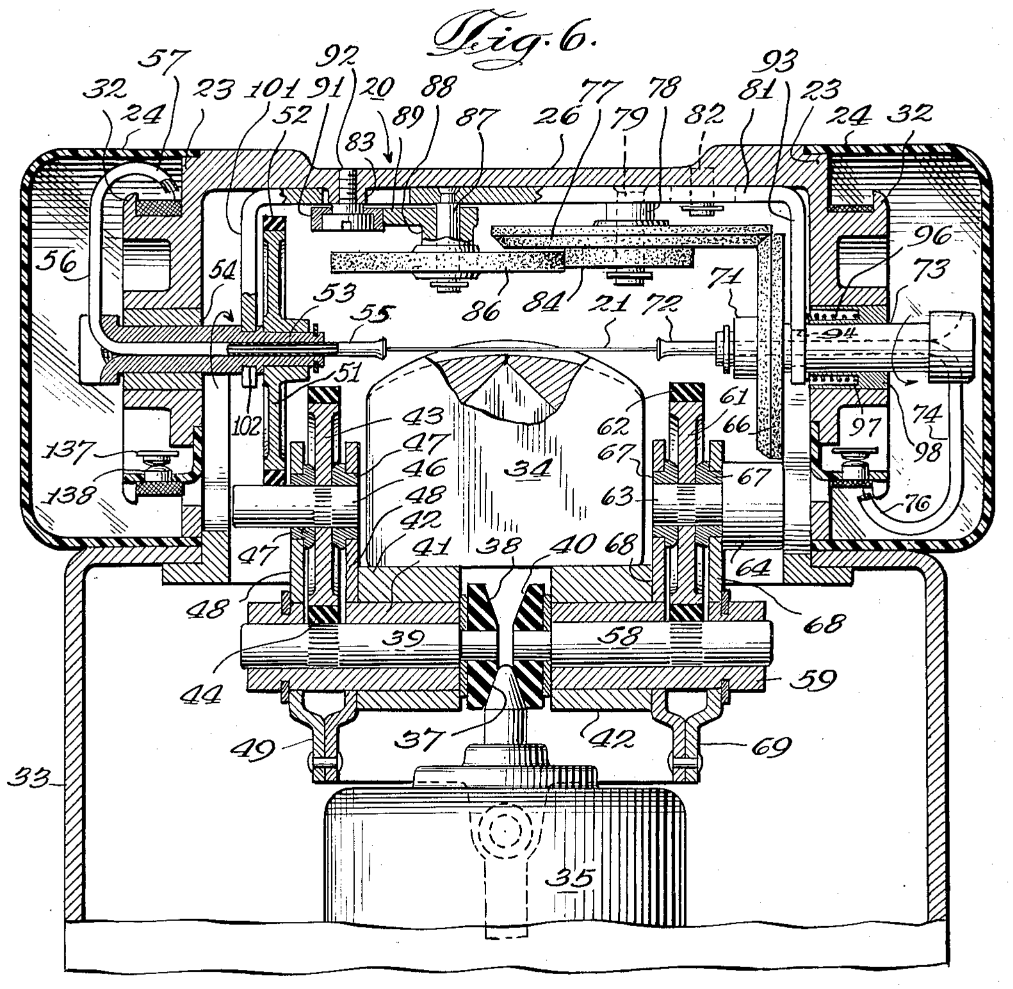
Fig. 6 is a longitudinal sectional view, to an enlarged scale, taken through the magazine and recording device seen in Fig. 5.
Figure 5:
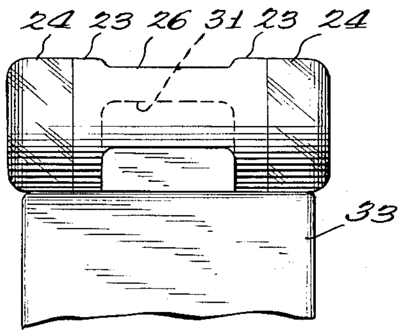
Fig. 5 is a view showing the magazine seen in Figs. 1 to 4 disposed in position on a magnetic recording and reproducing device for use therewith.

In the position seen in Fig. 6, the shifter yoke 49 has been moved to a position so that the stub shaft 46 engages the driven puck 51 to move the recording medium 21 past the recording head 34. In this position of the shifter yoke 49, the other shifter yoke 69 has been moved to a position so that the enlarged shaft portion 64 is out of engagement with the beveled roller 66. The roller 66 has a hub 71 which is also fast with a wire guide 72, the wire guide 72 being concentric with the hub 71 and a shaft extension 73 therefrom. The guide 72 also has an arm 74 with a curved extension 76 extending around the periphery of the right hand reel 32 so as to properly guide the wire thereon.

With the roller 66 out of contact with the portion 64 it is free to have rotative motion so that the recording medium 21 can be payed off from the right hand reel 32.

When it is desired to move the recording medium from the left hand reel 32 to the right hand reel 32 the yokes 49 and 69 are reversed in position, with the portion 64 arranged to contact the bevel roller 66. Puck 51 then is an idling puck, and is free to rotate so that the arm 56 for the wire guide 55 can rotate with respect to the left hand reel 32 to draw the wire 21 therefrom. It may be noted that in the rewind process the speed of movement of the wire 21 is faster than in the recording position, by reason of the enlarged diameter of the portion 64.

For many purposes random winding on the stationary reels 32 is satisfactory. It is desirable, however, that the reels be layer wound so as to store a larger amount of wire thereon. To this end the puck 51 and the beveled roller 66 are enabled to move longitudinally of their respective driving means so that the wire guide arms 56 and 74 can move longitudinally of their respective reels while rotating, thereby to layer wind upon the respective reels.

Means are accordingly provided to achieve such end, and the beveled roller 66 accordingly cooperates with a bevel roller 77 having a hub 78 free to turn upon a stub shaft 79 secured on a level winding shifter rod 81. The shifter rod 81 is guided upon a pin 82 secured in the wall 26 of the magazine 20 and upon a boss 83 extending inward of the walls 26 and molded integrally therewith.

The beveled roller 77 is fast with a roller 84 turning with a roller 86. A stub shaft 87 supports the roller 86 which has a hub 88 and an eccentric 89 fast therewith. The eccentric 89 contacts a follower 91 supported on a cap screw 92 threaded into the boss 83.

The shifter rod 81 accordingly is moved translatively by the eccentric 89 and against the follower 91. The shifter rod 81 has an extension 93 bored at 94 to be supported on the shaft 73. A spring 96 having one end bottomed against the extension 93 biases the extension to the left as seen in Fig. 6, the other end of spring 96 being bottomed in an annular slot 97 of a bushing 98 supporting the shaft 73. The shifter rod 81 also has an extension 101 engaged in an annular groove 102 on the shaft 53. It will thus be seen that the wire guiding arms 56 and 74 are moved longitudinally of the reels 32, 32 to effect level winding thereon.

Referring now to Figs. 7 to 10 of the drawings there is shown an alternate embodiment for level winding of the record medium 21. In this embodiment of the invention the motor 34 has a power takeoff consisting of a bevel gear 106 driving a bevel pinion 107 fast on a shaft 108 and supported in a bearing 109. The bevel pinion 107 is fast to an eccentric 111 cooperating with a push rod follower 112 supported in guides 113 and 114 extending from the flange 29. The push rod 113 has reciprocating movement and a roller 116 at the end thereof rides on a camming surface 117 of a level wind shifter 118.

The shifter 118 has extensions 119 and 121 respectively engaged in annular grooves 122 and 123 of shafts 53 and 73. As with the embodiment seen in Fig. 6, the shaft 53 supports a driving puck 51 having a rubber rim 52, and the shaft 73 supports a driving puck 124. This latter puck does not have a beveled surface as does the puck 66 of Fig. 6.

Figure 7:
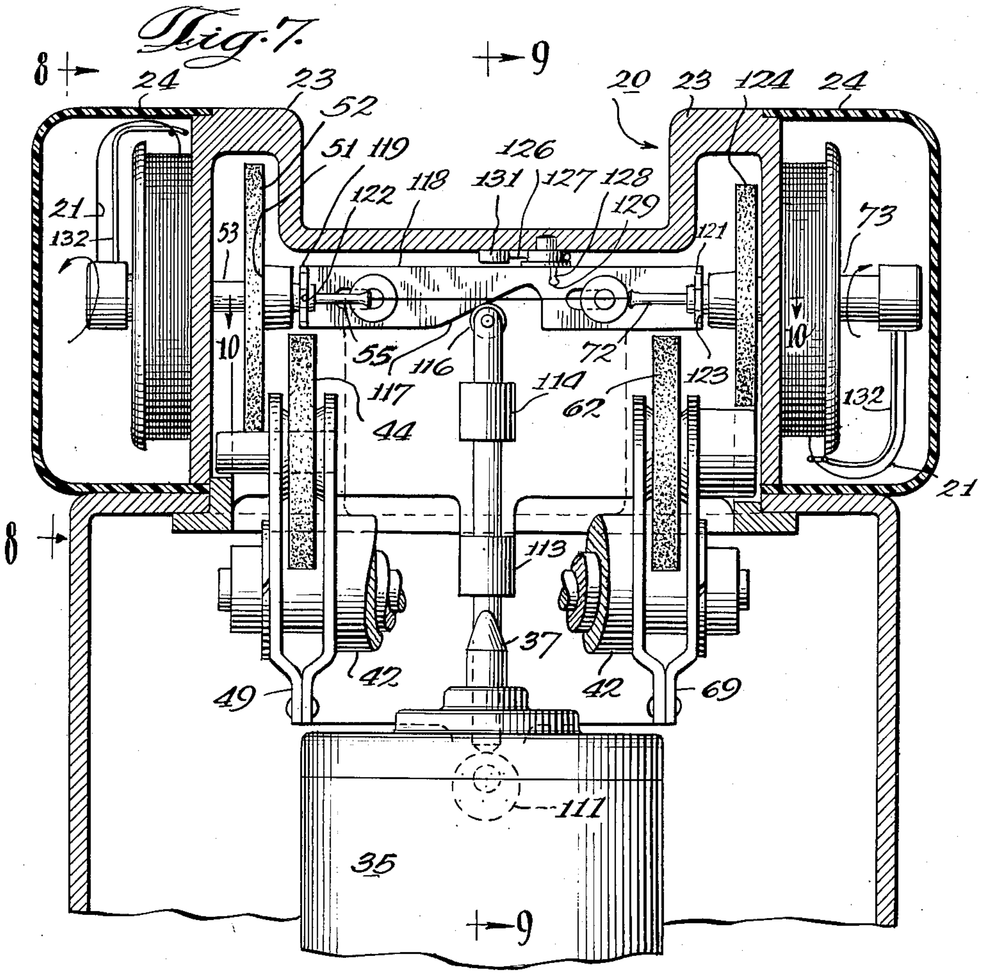
Fig. 7 is a sectional view, similar to Fig. 6 of another form of the invention.
Figures 9, 10, 11:
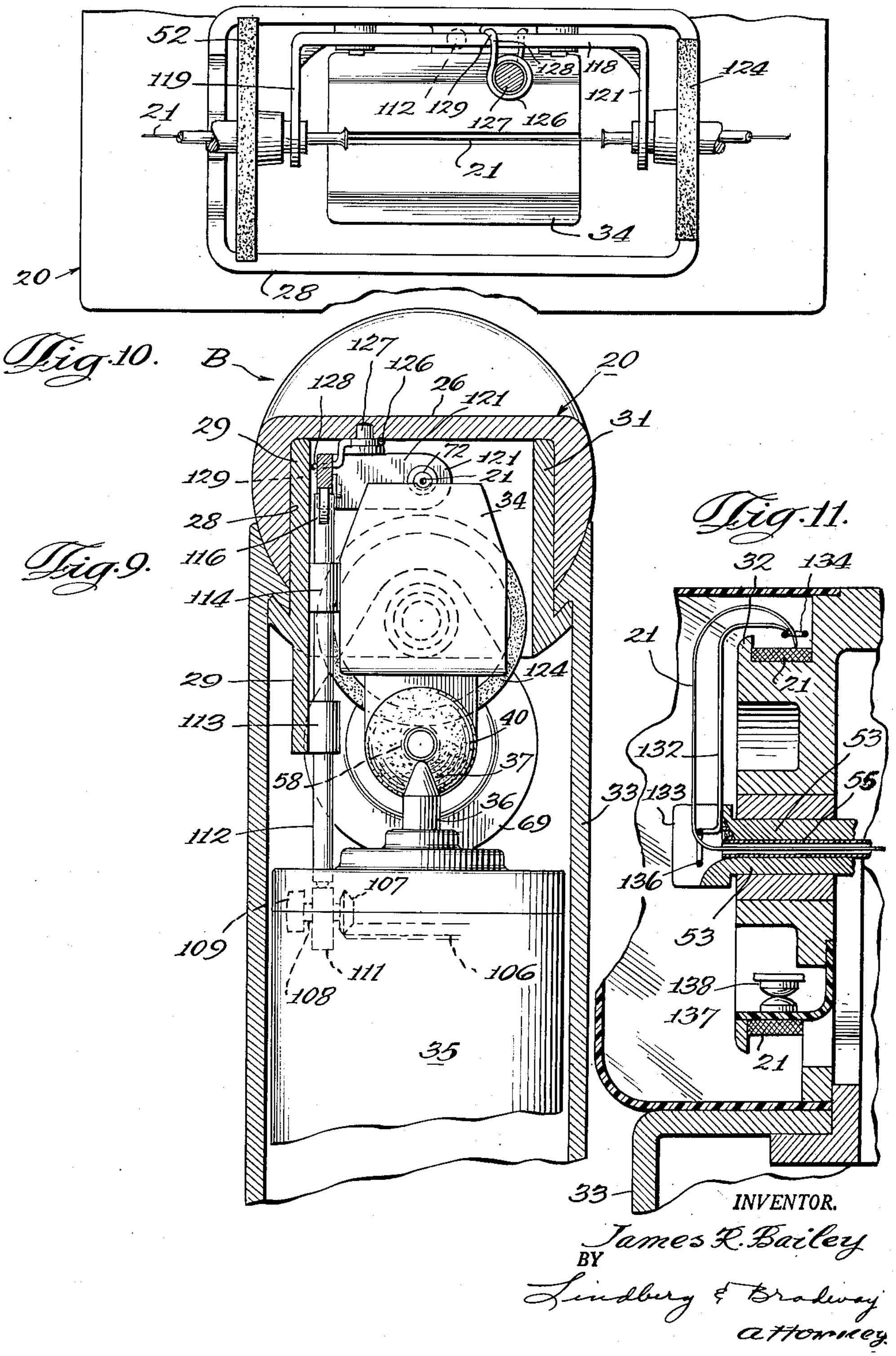
Fig. 9 is a transverse sectional view taken approximately on the line 9—9 of Fig. 7 showing details of one form of a layer winding mechanism for the magnetic recording medium.
Fig. 10 is a sectional view taken on the line 10—10 of Fig. 7, certain parts being shown in plan.
Fig. 11 is a sectional view on an enlarged scale of one of the wire storage magazines seen in Figs. 6 and 7.

Means are provided for biasing the level wind shifter 118 to the right as seen in Fig. 7 to cause the roller 116 to engage the camming surface 117, and as seen in Figs. 9 and 10, the front wall 26 of the magazine 20 supports a torsion spring 126 supported by a stub pin 127 extending from the inside of the front wall 26. The torsion spring 126 has an arm 128 therefrom passing through an aperture 129 in the level wind shifter 118. The other end of the torsion spring 126 is anchored in a boss 131 extending from the inside of the wall 28.

Figure 8:
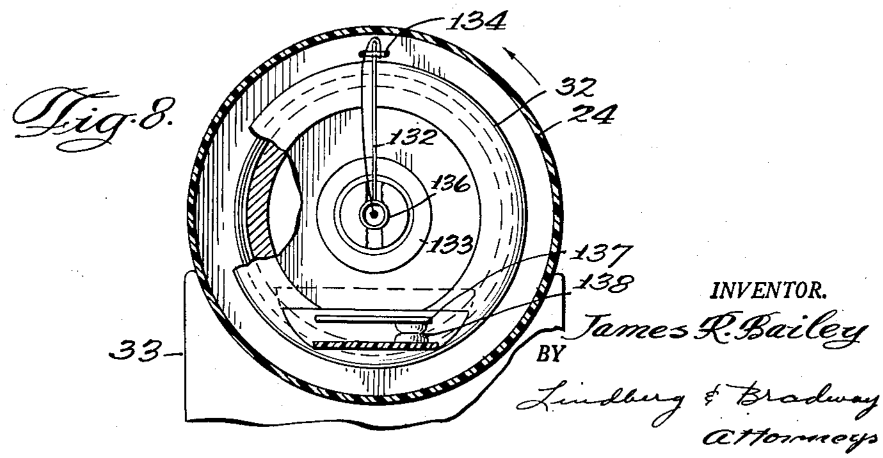
Fig. 8 is a sectional view taken on the line 8—8 of Fig. 7.

Referring now to Fig. 8 of the drawings, in this embodiment of the invention the wire is guided for spooling upon the reels 32 by an arm 132 supported at its inner end upon the end 133 of the shaft 53. The arm 132 terminates adjacent the periphery of the reel 32 in an eye guide 134, to guide the record medium 21. The inner end of the arm 132, which turns with the shaft 53 also has an eye guide 136 for guiding the record medium 21 thereat. In this embodiment of the invention the guides 54 and 72 for the wire 21 need only be of a length necessary for proper guiding past the recording head 34.

Referring now to Figs. 6 and 7 of the drawings, the reels 32 may each be provided with a micro switch 137 which has a switch actuator 138 adapted to close the switch 137 when a sufficient amount of wire has been wound on the reel 32. When less than such an amount is wound thereon, the switch 37 will open thereby to prevent any further unwinding therefrom. The switch 137 may be connected to suitable control mechanism to stop the motor 34 which cannot be energized again in the same direction unless the wire has previously been built up on the reel 32.

It will be apparent from the description foregoing that in either embodiment of the invention, the magazine complete with the wire therein can be removed from the recording unit. Irrespective of whether the level winding is of a form as found in Fig. 6 or in Fig. 7, the level winding mechanism is integral with the magazine, and can be removed therewith.

It will be apparent from the description foregoing that the movement of the wire past the recording head is achieved with a minimum of heavy rotating parts, these being the driving pucks, the shafts through which the wire moves, and the very light weight spooling arms located within the end closures 24. Deceleration of the parts to a complete stop obviously can easily be achieved. Since all of the parts are of extremely small mass a rapid acceleration to proper recording speed can be achieved.

It should be understood that the invention is not limited to the details of the structures described, but comprehends and includes such variations and modifications as are embraced within the scope of the invention as defined by the claims here appended.

I claim:

1. Magnetic recording wire storage means comprising a frame, a pair of stationary reels mounted coaxially on said frame in spaced apart position, a hollow wire winding mechanism supported on said frame adjoining each reel mounted rotatably and coaxially relatively to said reels, a driving puck for each of said wire winding mechanism, each mechanism having wire guiding means positioned coaxially with its associated reel and other wire guiding means positioned radially outside of the reel and rotatable thereabout for guiding the wire received from the other reel as it is being wound upon the associated reel, said mechanisms including means for moving the same axially relatively to the reels, and means for imparting such axial movement to said mechanisms to effect layer winding of the wire on said drums, and means selectively engageable with said pucks for rotating each mechanism independently of the other.

2. In a magnetic wire recorder, wire storage means detachable from the recorder as a unit comprising a frame, stationary wire storage reels supported on said frame and mounted in spaced apart positions and mutually coaxial, hollow wire winding means associated with each reel mounted for rotation about an axis coaxial with the reel, means for rotating said wire winding means including a driving puck mounted on each wire winding means, said wire winding means having a wire guide member positioned radially outside the wire storage surface of each reel and rotatable thereabout for guiding wire being wound upon and unwound from said reel, and means selectively engaging said pucks for driving them.

3. In a magnetic wire recorder, wire storage means detachable from the recorder as a unit comprising a frame, stationary wire storage reels supported on said frame and mounted in spaced apart positions and mutualy coaxial, hollow wire winding means associated with each reel mounted for rotation about an axis coaxial with the reel, means for rotating said wire winding means including a driving puck mounted on each wire winding means, said wire winding mechanism including a wire guide member positioned radially outside the wire storage surface of each reel and rotatable thereabout for guiding wire being wound upon and unwound from said reel, each winding mechanism being mounted for axial reciprocation relatively to the associated reel, means for reciprocating said mechanisms, and driving means selectively engageable with each driving puck and maintaining a driving contact therewith during axial reciprocation of the winding mechanism.

4. In a magnetic wire recorder, a frame and a pair of stationary reels secured to opposite ends of said frame with their axes aligned, a hollow shaft rotatably mounted in each reel and coaxial therewith, a puck fixed on each shaft for rotating the same, means selectively engageable with said pucks for rotating them, a wire winding arm mounted for rotation with each shaft and having means for engaging a wire extending through and from said hollow shaft, and for guiding the wire in a winding action upon said reel.

5. In a magnetic wire recorder, a frame, a wire storage magazine adapted to be detachably supported on said frame, a pair of longitudinally spaced coaxial stationary wire storage reels in said magazine, hollow winding and guiding means extending coaxially with said stationary reels and terminating in a portion disposed radially beyond each storage reel, a driving puck fast on each wire guiding means, a motor mounted in said frame, and means selectively effecting a driving connection between said motor and one of said driving pucks.

6. The invention as defined in claim 5 wherein said selective means includes means for driving one of said wire winding and guiding means at a greater speed than the other.

7. The invention as defined in claim 5 wherein means are provided in said magazine for shifting said winding and guiding means axially relative to said reels, and wherein means driven by said motor are provided for operating said shifting means.

References Cited in the file of this patent

UNITED STATES PATENTS

| | | |
|---|---|---|
| 1,513,403 | Lebeis | Oct. 28, 1924 |
| 2,497,142 | Shepherd | Feb. 14, 1950 |
| 2,873,925 | Huth et al. | Feb. 17, 1959 |